3,293,302
PROCESS FOR PREPARING HYDROXYMETHYL-
PHOSPHINE OXIDES
Ivan C. Popoff, Ambler, and James Ping King, Elkins Park, Pa., assignors to Pennsalt Chemicals Corporation, Philadelphia, Pa., a corporation of Pennsylvania
No Drawing. Filed June 24, 1963, Ser. No. 290,235
5 Claims. (Cl. 260—606.5)

This invention deals with an improved process for the preparation of hydroxymethylphosphine oxides, that is, compounds having the structure $R_1R_2P(O)CH_2OH$ where $R_1$ and $R_2$ are selected from the group consisting of alkyl and aryl hydrocarbon radicals containing from one to ten carbon atoms.

Hydroxymethyldiphenylphosphine oxide (also known as diphenylphosphinylmethanol) is a known compound of valuable chemical utility and has been prepared by the reaction of diphenylphosphine and para-formaldehyde with subsequent treatment of the reaction product with a strong oxidizing agent (see H. Hellman and J. Bader, Tetrahedron Letters, 1961, p. 724, and S. Trippett, J. Chem. Soc., 1961, p. 2813). However, phosphines and particularly diphenylphosphine are very toxic chemicals and extremely difficult to handle. In view of this extremely toxic nature of diphenylphosphine, we have made attempts to make hydroxymethyldiphenylphosphine oxide from the less toxic phosphine oxide derivatives and this involved hydrolyzing chloromethyldiphenylphosphine oxide under both acidic and basic conditions. However, our investigation has shown that the chlorine atom on the chloromethyl group is extremely inert and is quite resistant to hydrolysis even under conditions of refluxing 6 N. KOH solution.

It has now been found, however, that hydroxymethylphosphine oxides of the above structure may be made from the corresponding chloromethylphosphine oxides by fusing the chloromethylphosphine oxide with an excess of an alkali metal acetate and subsequently hydrolyzing the product with an aqueous acid solution.

In carrying out the process of this invention a mixture of the appropriate solid chloromethylphosphine oxide (made by the process of Kabachnik and Shepeleva, Izvest. Akad. Nauk. S.S.S.R., Otdel Khim Nauk. 1953:862) and the alkali metal acetate (e.g. sodium acetate, potassium acetate and the like) is heated at temperatures between about 135° to 175° C. and after the heating period, a dilute aqueous solution of a mineral acid such as hydrochloric acid, sulfuric acid, nitric acid, phosphoric acid, and the like is added to the fused product and the mass refluxed with agitation to achieve hydrolysis. It is preferable to use an acid concentration of about 0.5 to 3 M. Alternatively, an alkaline hydrolysis may be used instead of aqueous acid. In this technique, aqueous solutions of sodium hydroxide, potassium hydroxide, sodium carbonate, sodium bicarbonate, calcium hydroxide and the like may be used. In fact, since this hydrolysis step is not critical, simple aqueous hydrolysis under essentially neutral conditions may also be used providing hydrolysis is carried out for sufficient time at elevated temperatures. During the fusion step it is preferable to agitate the mixture slightly so as to enhance heat distribution throughout the fusion mass. The fusion reaction is deemed essentially complete when the fusion mass becomes a homogeneous, viscous fluid and heating is continued for a short time after this point is reached to ensure complete reaction. After the fusion mass is hydrolyzed, the product is separated by extracting the mass with a solvent with which water is immiscible, but in which the product is soluble, and this will usually be an organic solvent such as chloroform, carbon tetrachloride, ether, toluene, and the like.

Work up of the product from the organic solvent extract is carried out in the usual manner by evaporation of the solvent, crystallization, or any of the other useful techniques familiar to organic chemists.

The following examples will serve to more completely illustrate the method of the invention.

Example 1

A mixture of 25 g. $(C_6H_5)_2P(O)CH_2Cl$ and 38 g. $NaOCOCH_3$ is placed in a 250 ml. beaker partially immersed in an oil bath kept at 150° to 170° C. for three hours. The mixture is occasionally agitated with a glass rod during heating. At the end of the heating period about 400 ml. of 2 M. HCl solution is added to the fused product. The resulting milky solution is refluxed for two hours and then stirred at room temperature for 12 hours. The hydrolyzed product is extracted three times with 100 ml. portions of chloroform. The combined chloroform extracts are evaporated on a steam bath to a viscous oil to which 200 ml. of benzene is added. Several crops of solid, total weight 14.1 g. (60% yield, M.P. 135–139° C.) are isolated from the benzene solution. Repeated recrystallization from benzene gives a white crystalline solid, M.P. 138–139° C. Calcd. for $C_{13}H_{13}O_2P$: C, 67.20; H, 5.60; P, 13.33. Found: C, 67.37; H, 5.71; P, 13.25.

Example 2

A mixture of 10 g. chloromethylmethylphenylphosphine oxide and 20 g. of sodium acetate is placed in a 250 ml. beaker and is fused between 150° and 170° C. for three hours. The fused product is worked up in the same manner as described in Example 1 to give $$C_6H_5(CH_3)P(O)CH_2OH$$

The chloromethylmethylphenylphosphine oxide for this example is made by a procedure which is detailed as follows: A solution of 66 g. (0.032 mole) of $$C_6H_5(ClCH_2)P(O)Cl$$

(prepared by the method of Kabachnik and Shepeleva C. A. 49:843, 1955) in 300 ml. of anhydrous ether is chilled below 15° C. in a three-necked, one-liter flask equipped with a mechanical stirring motor, an additional funnel, and a reflux condenser. A solution of 0.32 mole of $CH_3MgBr$ in ether is added through the funnel at such a rate that the reaction temperature never exceeds 25° C. The mixture is then stirred an additional two hours. After the ether is poured off, the gummy residue is poured into 750 ml. of water containing 60 g. of $Na_2CO_3$. The resulting solution is extracted four times with 250 ml. portions of chloroform, and the extracts are evaporated on a steam bath. To the residue is added 80 ml. of petroleum ether. The white solid which immediately forms is recrystallized from benzene repeatedly to yield a product melting at 106–108° C. Calcd. for $C_6H_5(CH_3)P(O)CH_2Cl$: C, 50.80; H, 5.32; Cl, 18.70; P, 16.50. Found: C, 50.30; H, 5.32; Cl, 17.89; P, 16.62.

Example 3

A mixture of 13 g. of chloromethyldimethylphosphine oxide and 38 g. of sodium acetate is placed in a 250 ml. beaker and is fused between 150° and 170° C. for three hours. The fused product is then treated in the same manner as described in Example 1 to yield $$(CH_3)_2P(O)CH_2OH$$

Example 4

Following the details of Example 1, chloromethyldi(naphthyl)phosphine oxide is fused with sodium acetate to yield $(C_{10}H_6)_2P(O)CH_2OH$.

Instead of using the specific chloromethylphosphine oxides of the above examples, other chloromethylphosphine oxides such as chloromethyldioctylphosphine oxide, chloromethylbutylphenylphosphine oxide, chloromethylmethyltolylphosphine oxide, and the like may be used with equivalent results.

It will be understood that numerous changes and modifications may be made from the above description and examples without departing from the spirit and scope of the invention.

We claim:

1. The process of preparing hydroxymethylphosphine oxides having the structure

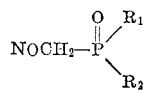

where $R_1$ and $R_2$ are hydrocarbon groups selected from the class consisting of alkyl and aryl groups containing from one to ten carbon atoms which comprises fusing a chloromethylphosphine oxide of structure $$R_1R_2P(O)CH_2Cl$$

with an alkali metal acetate and hydrolyzing the fusion mass.

2. The process of claim 1 where the alkali metal acetate is sodium acetate.

3. The process of claim 2 wherein $R_1$ and $R_2$ are phenyl.

4. The process of claim 2 wherein $R_1$ and $R_2$ are methyl.

5. The process of claim 2 wherein $R_1$ is phenyl and $R_2$ is methyl.

No references cited.

HELEN M. McCARTHY, *Acting Primary Examiner.*

W. F. W. BELLAMY, *Assistant Examiner.*

UNITED STATES PATENT OFFICE
CERTIFICATE OF CORRECTION

Patent No. 3,293,302 December 20, 1966

Ivan C. Popoff et al.

It is hereby certified that error appears in the above numbered patent requiring correction and that the said Letters Patent should read as corrected below.

Column 3, lines 14 to 17, the formula should appear as shown below instead of as in the patent:

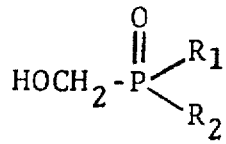

Signed and sealed this 12th day of September 1967.

(SEAL)
Attest:

ERNEST W. SWIDER
Attesting Officer

EDWARD J. BRENNER
Commissioner of Patents